United States Patent Office 3,567,624
Patented Mar. 2, 1971

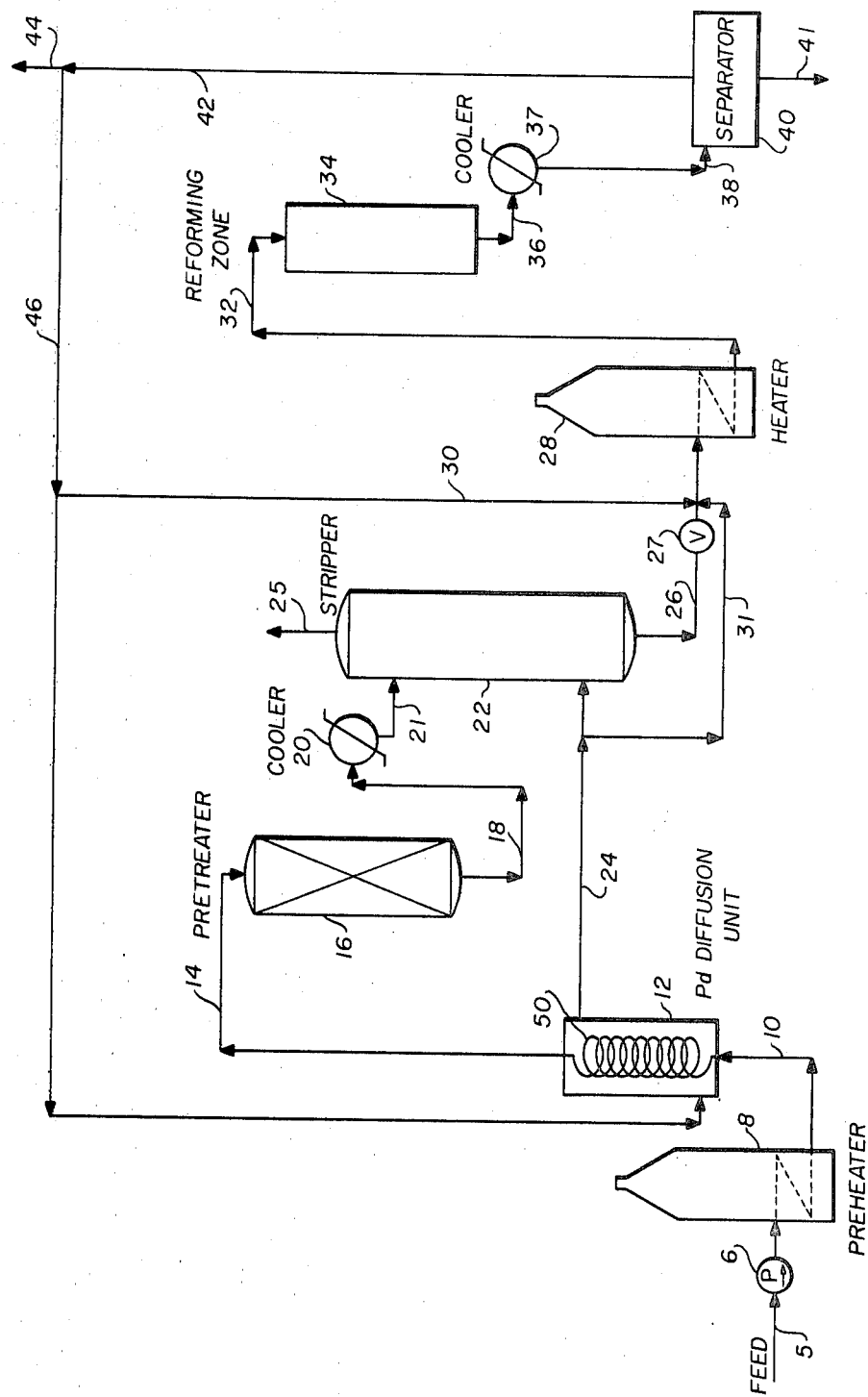

3,567,624
HYDROFORMING WITH PRELIMINARY HYDRODESULFURIZATION
William C. Pfefferle, Middletown, N.J., assignor to Engelhard Minerals & Chemicals Corporation, Newark, N.J.
Filed July 17, 1968, Ser. No. 745,603
Int. Cl. C10g 23/00
U.S. Cl. 208—89                              5 Claims

ABSTRACT OF THE DISCLOSURE

A combination process for the desulfurization and catalytic hydroforming of normally liquid hydrocarbons wherein the hydrogen required for desulfurization is obtained from the hydroformer reaction product and introduced into the feed to the desulfurizer by diffusion through a non-porous hydrogen permeable membrane.

---

This invention relates to the refining of petroleum hydrocarbons. It further relates to a combination of refining st ps for preparing the feed stock to a catalytic reforming operation whereby the feedstock is more effectively and economically desulfurized by means of make gas generated in the reforming operation.

Catalytic reforming processes are widely practiced in the petroleum refining industry for the purpose of upgrading the octane number of the heavy naphtha fraction of crude oil. The process is conducted by passing a suitable hydrocarbon charge stock over a platinum-containing catalyst at an elevated temperature and pressure in the presence of substantial amounts of hydrogen. Hydrogen is produced in the reforming process, and it is necessary to continuously recycle at least a part of the hydrogen produced to avoid formation of carbon on the reforming catalyst which formation would lead to a rapid loss of catalyst activity.

Catalytic reforming processes employing virgin and/or cracked naphtha having a boiling point in the range of 100° to 500° F. are generally effected by contacting the feedstock with a platinum type catalyst at an elevated temperature of 800 to 1000° F., pressures of 100 to 1000 p.s.i.g. and with hydrogen recycle rates of about 3000 to 12,000 s.c.f./bbl. of feed, maintained by recycling hydrogen-containing gas produced in the process.

It has been recognized that the catalysts employed in catalytic reforming processes are generally sensitive to sulfur. Since the usual charge stock to the process contains sulfur and other catalyst poisons, it is conventional practice to pretreat the feed before contacting it with the platinum catalyst. The pretreatment is usually conducted in a separate vessel under conditions of elevated temperature and pressure. A catalyst is usually employed in the pretreatment step and this may be, for example, cobalt molybdate. It is also necessary to effect the pretreatment step in the presence of added hydrogen.

It is conventional practice in the catalytic reforming art to recycle the hydrogen-rich gas separated from the catalytic reformer products to the reforming reactors, and since there is an excess of hydrogen produced in the reforming reaction, to employ a part of the recycle gas in the pretreater where hydrogen is consumed. Conventionally, e.g. when employing cobalt molybdate catalyst in the pretreater, the pretreater is operated at a temperature of 500–800° F. and pressure of 200–900 p.s.i.g. In general, the reformer is operated at a pressure substantially lower than that employed in the pretreater, and it is necessary to compress that part of the reformer recycle gas which is employed in the pretreater to the more elevated pressure of the pretreater in order to operate the pretreater at the desired higher pressure. This becomes even more necessary where, as is the current practice, the reformer is operated at substantially lower pressures than has been the case in the past. Current practice, e.g. contemplates reformer operation at separator pressures of 150–250 p.s.i.g. (and possibly even lower), substantially below the most efficient operating pressure of conventional pretreatment reactors.

In accordance with the present invention, hydrogen-rich gas separated from a catalytic reformer is contacted with one side of a non-porous palladium-containing diffusion membrane while passing pre-heated sulfur-containing feed to the naphtha pretreater in contact with the other side of the membrane at a temperature at which diffusion of hydrogen occurs through the membrane, the hydrogen-rich gas being at a substantially lower pressure than the pressure of the pre-heated naphtha feed. As is well known, the diffusion of hydrogen through a non-porous palladium-containing membrane is dependent upon the partial pressure of hydrogen on each side of the membrane, rather than the total pressure on either side. Accordingly, while the total pressure of the hydrogen-containing gas is lower than that of the pretreater feed, the high hydrogen content of the reformer recycle gas and the absence of hydrogen in the pretreater feedstock results in a hydrogen partial pressure differential across the diffusion membrane causing the diffusion of hydrogen from the recycle gas into the pretreater feedstock. Accordingly, by employing the process of the present invention, hydrogen available at a lower pressure than required for direct introduction e.g. by means of a compressor into the high pressure pretreater feedstock is effectively injected into the pretreater feed without resort to an intermediate compressor, with concomitant savings in capital investment and operating expense.

The hydrogen diffusion unit which is employed in connection with the process of the present invention may be any conventional hydrogen diffusion equipment which employs a palladium or palladium alloy diffusion membrane for the separation of hydrogen from a mixture of gases. Such units may, for example employ non-porous palladium tubes in a shell as disclosed in U.S. Pat. 2,911,057, patented Nov. 3, 1959 or may use palladium or palladium alloys in the form of thin sheets or foil, as disclosed in U.S. Pat. 3,238,704, patented Mar. 8, 1966. The particular design of the hydrogen diffusion unit is in no way critical, the only requirement being that sufficient diffusion capacity is provided to permit addition to the pretreater feedstock of the desired amount of pure hydrogen.

In operating the process of the present invention, the recycle gas stream which is depleted of part of its hydrogen content by passing through the diffusion unit is recycled to the reformer reactor. All or a part of the excess recycle stream, consisting of undiffused hydrogen and gaseous or low-boiling hydrocarbons together with inerts is advantageously used to strip hydrogen sulfide formed in the pretreater from the pretreater effluent prior to introduction thereof to the reformer.

The process of the invention will be better understood by reference to the attached patent drawing wherein a schematic flow diagram of the process is presented. Referring now to this drawing, the hydrocarbon feedstock, e.g. a heavy virgin naphtha containing about 0.3 wt. percent sulfur and boiling within the range of about 200 to 330° F. is introduced through line 5 and pumps 6 to preheater 8 from which the feed at a temperature of about 700° F. and pressure of about 600 p.s.i.g. passes by line 10 to palladium diffusion unit 12. The feed now containing added hydrogen, as more fully described hereinafter, passes by line 14 to pretreater 16 which contains a hydrofining catalyst, e.g. cobalt molybdate or nickel molybdate on an alumina carrier, and which may be operated at a temperature of about 700° F., a pressure of 600 p.s.i.g., a hydrocarbon feed rate of 2 volumes of feed (liquid) per volume of catalyst and with 150–1500, usually 200–500 s.c.f./bbl. of hydrogen gas.

The effluent vapors from the pretreater 16 flow through line 18 and are charged to cooler 20 wherein they are cooled sufficiently to condense normally liquid constituents. The cooled material passes by line 21 to stripping tower 22. In stripping tower 22 it is treated with gasiform material such as hydrogen, nitrogen or any inert gas, preferably as shown in the attached drawing, with hydrogen-depleted reformer recycle gas introduced by line 24 from palladium diffusion unit 12. In stripping tower 22, the stripping gas passes upwardly through the liquid and serves to remove excess volatile sulfur-containing material, such as $H_2S$. The stripping gas and the removed sulfur-containing material are rejected from the system through line 25 for processing in any desired manner as, for example, by passage through a conventional petroleum refinery light ends plant.

The naphtha now substantially free of sulfur is withdrawn from stripper 22 through line 26 carrying valve 27 and charged to heater 28. Hydrogen-containing gas in line 30 is also charged to furnace 28, together with all or part of the hydrogen-depleted reformer recycle gas from palladium diffusion unit 12 introduced by line 31, and this mixture is heated to a hydroforming temperature and thence withdrawn through line 32 to a reforming zone 34 containing a bed of hydroforming catalyst, e.g. platinum on alumina or any other conventional hydroforming catalyst.

It will be understood that reforming zone 34 conventionally comprises a plurality of catalytic reactors which are employed serially. In accordance with usual practice, the naphtha feed is introduced into reforming zone 34 at an initial temperature of 800–950° F. and a pressure of 150 to 500 p.s.i.g., and reheated between the various reactors by means of furnaces. Generally, the naphtha feed is introduced to the reforming zone at a feed rate of 0.1 to 5 volumes of liquid hydrocarbon per volume of catalyst per hour and hydrogen recycle rates of about 5000 s.c.f./bbl. of feed.

The product of the hydroforming reaction is withdrawn through line 36, passed to cooler 37 and thence passed by line 38 into a separator 40. The crude product in separator 40 is at a temperature of about 100° F. and, therefore, normally liquid constituents are in the form of a hydroformed condensate. This condensate may be withdrawn from separator 40 through line 41 and delivered to distillation and other finishing equipment to obtain the desired product. The gasiform material which contains 70–90% hydrogen is withdrawn overhead from separator 40 through line 42 and a portion of this material may be rejected if desired from the system through line 44.

The remainder of the gasiform material is passed by line 46 for recycle to line 30 (as previously explained) and to hydrogen diffusion unit 12 for diffusion of contained hydrogen into the preheated feed to the preheater 16. Diffusion unit 12 may, for example, consist of one or more palladium alloy coils 50 through which the preheated feed passes, entering by line 10 and passing to the preheater 16 by line 14. The diffusion coils, consisting, for example of ⅛–¼-inch diameter palladium having a wall thickness of 3–10 mils are contained in a shell into which hydrogen-containing recycle gas is introduced by line 46 and withdrawn by line 24. Coils 50 at a temperature of about 700° F. are permeable to hydrogen, and due to the hydrogen partial pressure differential across the coil surface, hydrogen diffuses into the coil where it is admixed with feed to the pretreater. Sufficient coil surface of an appropriate wall thickness is employed to provide for diffusion of 150–1500, usually 200–500 s.c.f./bbl. of hydrogen for desulfurization of the feed.

It will be understood that hydrocarbon feedstocks other than the heavy naphtha of the example described above may be employed in the process of the present invention. It may be applied in any case where a desulfurized feed is to be subsequently processed in a reforming zone providing make hydrogen at a pressure substantially below that required for the pretreater. For example light and heavy virgin and/or cracked naphthas can be processed in this manner; heating oil, kerosenes, diesel fuels and distillate fuel oils can also be handled by this process. Likewise any conventional hydrofinining and catalytic reforming conditions, process and catalysts may be utilized without departing from the spirit or scope of the present invention.

What is claimed is:

1. In the process for hydroforming a normally liquid hydrocarbon feedstock containing sulfur which process comprises first subjecting the feedstock to hydrodesulfurization in admixture with hydrogen over a sulfactive catalyst at elevated temperature and superatmospheric pressure, stripping sulfur-containg materials from the feedstock and reforming the desulfurized feedstock in the presence of hydrogen over a hydroforming catalyst to produce a normally liquid hydroformer product and a gaseous product containing hydrogen which is recycled to the hydroformer, and wherein the hydrodesulfurization is effected at a first superatmospheric pressure and the hydroforming step is effected at a second and lower superatmospheric pressure, the improvement comprising contacting at least a part of the hydroformer recycle gaseous product containing hydrogen at said second and lower superatmospheric pressure with one side of a non-porous hydrogen-permeable membrane while contacting the other side of said membrane with the vaporized feedstock to the hydrodeesulfurization step at said first superatmospheric pressure, said membrane being at hydrogen diffusion temperature, whereby hydrogen diffuses from the reformer gaseous product into the feedstock to the hydrodesulfurization reactor to supply the hydrogen required for hydrodesulfurization.

2. The process of claim 1 wherein hydrogen-depleted gaseous reformer product is recycled to the reformer after contacting the diffusion membrane.

3. The process of claim 1 wherein hydrogen-depleted gaseous reformer product is employed as stripping gas to remove sulfur-containing materials from the hydrodesulfurization effluent.

4. The process of claim 1 wherein hydrogen is added by diffusion to the hydrodesulfurization feedstock in an amount of 150 to 1500 s.c.f./bbl. of hydrocarbon.

5. The process of claim 1 wherein the hydrodesulfurization is effected over a cobalt molybdate or nickel molybdate catalyst at a temperature of 500–800° F. and pressure between 200 and 900 p.s.i.g., and the gaseous reformer effluent is at a pressure of 50 to 250 p.s.i.g.

References Cited
UNITED STATES PATENTS

| | | | |
|---|---|---|---|
| 2,901,415 | 8/1959 | Hemminger et al. | 308—65 |
| 2,902,440 | 9/1959 | Beuther et al. | 208—210 |
| 3,251,652 | 5/1966 | Pfefferle | 23—213 |

PAUL M. COUGHLAN, Jr., Primary Examiner

R. BRUSKIN, Assistant Examiner

U.S. Cl. X.R.

700—133